United States Patent [19]
Field

[11] 3,745,912
[45] July 17, 1973

[54] BROILER WITH HEAT SINK MEANS

[75] Inventor: Thomas R. Field, Indianapolis, Ind.

[73] Assignee: Jenn-Air Corporation, Indianapolis, Ind.

[22] Filed: Mar. 16, 1972

[21] Appl. No.: 235,203

[52] U.S. Cl. .................................. 99/446, 99/447
[51] Int. Cl. ...................... A47j 35/00, A47j 37/00
[58] Field of Search .................... 99/446, 386, 427, 99/447; 219/385

[56] References Cited
UNITED STATES PATENTS

| | | | |
|---|---|---|---|
| 2,259,073 | 10/1941 | McGlaughlin | 99/427 |
| 2,603,740 | 7/1952 | Buttero | 219/385 |
| 2,790,434 | 4/1957 | Del Francia | 99/446 UX |
| 2,848,990 | 8/1958 | Haedike et al. | 99/447 UX |
| 3,086,449 | 4/1963 | Cahill | 99/446 |
| 3,098,427 | 7/1963 | Del Francia | 99/446 |
| 3,338,156 | 8/1967 | Angelos | 99/446 X |
| 3,444,805 | 5/1969 | Happel et al. | 99/446 X |
| 3,487,199 | 12/1969 | Hamlin | 99/446 X |
| 3,683,792 | 8/1972 | Groves et al. | 99/447 |

*Primary Examiner*—John Petrakes
*Assistant Examiner*—Arthur O. Henderson
*Attorney*—Harold R. Woodard

[57] ABSTRACT

An indoor open-air broiler having a heat sink in the form of a plate, with openings therethrough, adapted to underlie heating elements and grill and disposed above the grease drip pan so that greases and drippings falling thereon, after partial vaporization, pass on through to the drip pan. The plate has an upper surface of hills and valleys (preferably black) facing the heating elements, and a bottom surface (which may be smooth) facing the drip pan.

The plate absorbs heat from the heating elements and because of its upper surface maximizes heat emittance back towards the grill while minimizing heat emittance downwardly towards the drip pan.

12 Claims, 4 Drawing Figures

PATENTED JUL 17 1973 3,745,912

BROILER WITH HEAT SINK MEANS

BACKGROUND OF THE INVENTION

The invention relates to a heat sink in the form of a plate adapted for use with an indoor open-air broiler so as to return maximum heat to an overlying broiling area, and, at the same time minimizing heat emittance downwardly toward a reservoir, drip pan or other means where meat grease drippings are collected thereby reducing chances of sustained combustion of such greases.

The plate has openings therethrough whereby grease drippings falling thereon pass on through to the reservoir. The plate, preferably cast iron or alloy for high absorption, has a dark (preferably black) upper surface of hills and valleys for increased surface exposure for maximizing heat emittance back towards the grill, where broiling occurs.

BRIEF SUMMARY OF THE INVENTION

It is an object of the invention to provide an indoor open-air broiler with a heat sink for controlled heat emittance.

It is another object of the invention to provide an indoor open-air broiler with a heat sink between the heat source and grease collecting chamber for returning maximum heat to the broiling area and transmitting only less heat to the area of the collected grease.

BRIEF DESCRIPTION OF THE DRAWINGS

The invention will be more fully understood and further objects and advantages thereof will become apparent when reference is made to the following detailed description of the preferred embodiment of the invention and the accompanying drawings in which.

DESCRIPTION OF THE PREFERRED EMBODIMENT

Figure 1:
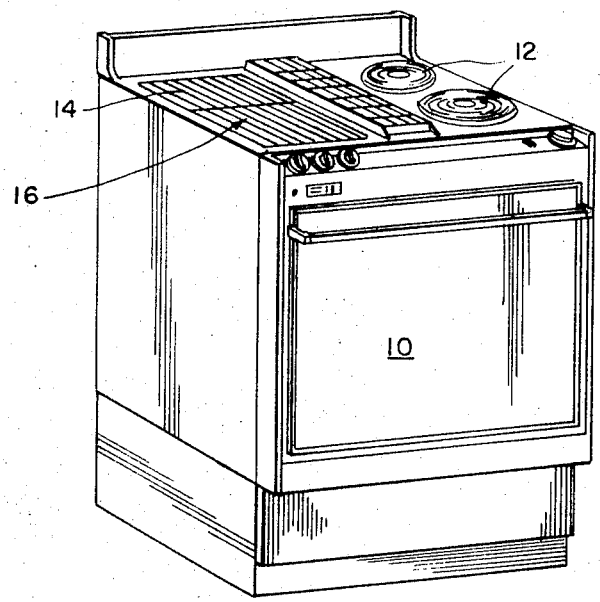
FIG. 1 is a perspective view of a ventilated kitchen range including an open-air or exposed surface broiler.

Referring now to the drawings, in FIG. 1 there is illustrated a range 10 in perspective view. The range contains an oven and surface units. The surface units comprise a pair of open cooking units 12 and a grill 14 which overlies electric heat rod for defining an open-air broiler.

The range is preferably an air ventilated range generally of the type disclosed in U.S. Pat. No. 3,587,555 issued to Joseph J. Cerola on June 28, 1971 and assigned to Jenn-Air Corporation. It is provided with internal conduit means in communication wijh a power driven fan for drawing streams of ventilating air through the oven (not illustrated) and over the surface units 12 and grill 14 of the open-air broiler, identified generally by the numeral 16. The ventilating air in passing over or in proximity to cooking or broiling areas entrains cooking smoke, vaporized greases and odor laden gases. The power driven exhaust fan (not shown) expells the ventilating air (with entrainment) through ducting to exteriorly of a building.

Figure 2:
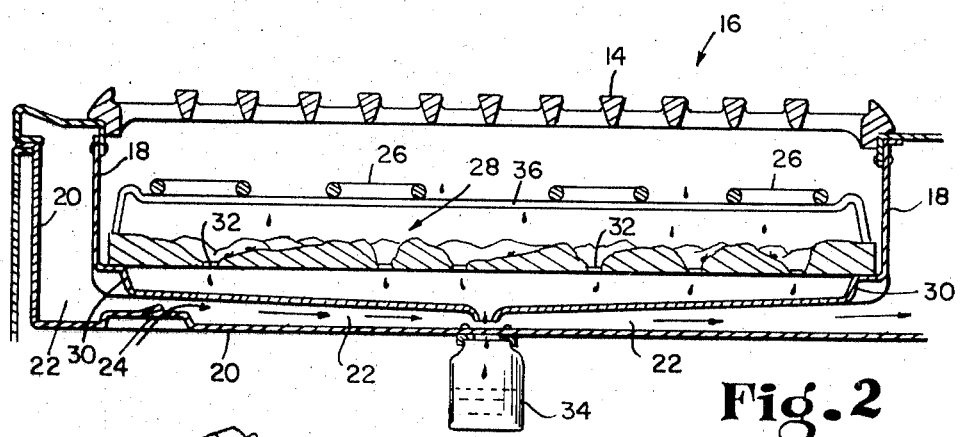
FIG. 2 is a cross-sectional view of the open-air broiler and illustrating the heat sink.

FIG. 2 is an enlarged cross-sectional view taken across broiler 16 for illustrating the construction thereof. The broiler 16 includes a recessed sheet metal housing 18 having side walls and a bottom which enclose electric broiling elements 26 and supports grill 14 across the opening at the top. As illustrated in FIG. 2, sheet metal 20 of the range is provided in the form of a recess in which is received housing 18 in a manner for providing space 22 therebetween. An opening 24 is provided in the bottom wall of recess 20 defining an air inlet into space 22. Another portion of space 22, oppositely disposed to opening 24, (not illustrated) is in communication with the suction side of the fan whereby ventilating air may be drawn through space 22 in a manner for removing heat as illustrated by the arrows. In this manner heat received by the bottom of housing 18 is transmitted to the air stream for exhaustion to the atmosphere.

Figure 3:
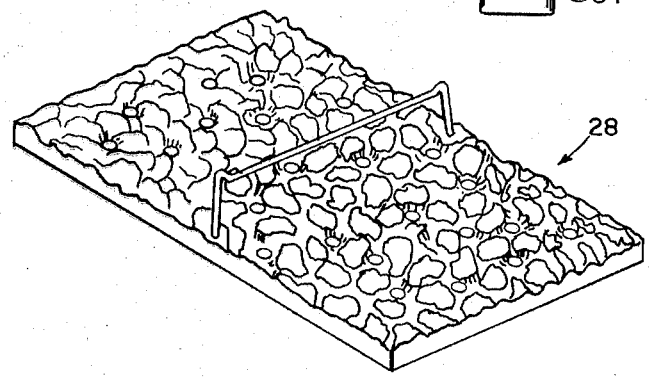
FIG. 3 is a perspective view of the heat sink in the form of a plate showing an upper surface of hills and valleys; and, FIG. 4 is a cross-sectional view of the plate illustrating the upper and lower heat emmiting surfaces.

In an effort to reduce the amount of heat which is transmitted to the bottom of housing 18, heat modulating means in the form of a plate, generally identified by the numeral 28, is provided to underlie heating elements 26. Plate 28 rests on steps 30 in a manner for its support above the bottom of housing 18. Since the plate also underlies grill 14, it is provided with openings 32 to allow passage of grease drippings which have fallen thereon. These greases run on through the openings toward collection means below, for example, the sloping bottom of housing 18 in communication with jar 34. The upper surface of the plate may have a contour or be so disposed to permit grease to flow over the side to the reservoir below. As shown in FIGS. 2 and 3, the plate has a cross bar 36 for supporting heating elements 26 in position. However, if other means are provided to support the elements, this bar may be eliminated.

The plate performs a dual function. Since it is hot, grease drippings falling thereon are partially seared and smoke rises upward for contact with and for flavoring of meat on grill 14. The plate defines heat sink or modulating means whereby heat absorbed from the heat source is reemitted back toward the meat at a higher rate than toward the grease drippings for reducing the chances of sustained combustion.

The upper surface of the plate is provided with hills and valleys to increase its surface exposure. As an aid in causing greases and drippings thereon to flow on through openings 32, the valleys between the hills are sloping and interconnected in networks defining troughs which terminate at a lower elevation at openings 32 through the plate. The upper surface is preferably of maximum surface exposure and black, while the bottom surface of the plate may be flat, as illustrated, or have an uneven surface and be bright. But the bottom surface is not so limited though the less surface exposed, the better.

Figure 4:
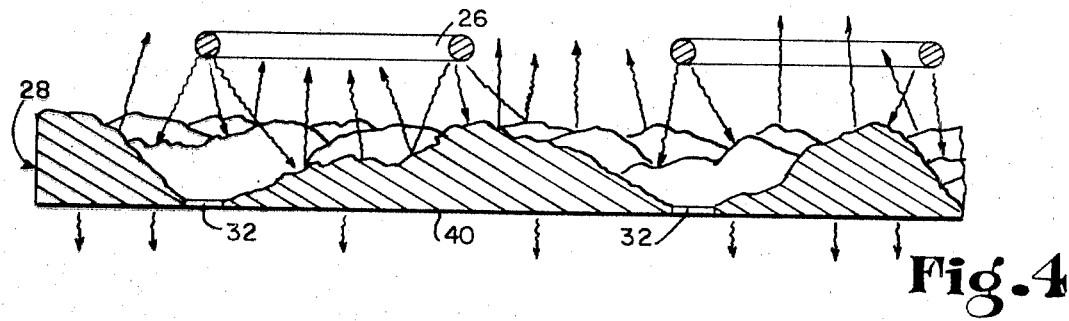

In FIG. 4 there is illustrated the transfer of heat from the overlying electric heating elements 26 to the mass, as defined by plate 28, where it is absorbed and then reemitted from both its surfaces. A portion of this heat is emitted or returned upwardly in the direction of the grill where meat is being broiled. By reason of the upper surface being dark and having hills and valleys, maximum heat is returned upwardly. Therefore, the plate by reason of its upper surface contour and color, maximizes the return of heat to the broiling area where it is used to aid broiling, and a lesser heat is transmitted on through and toward the collected grease where it is desired that the temperature be maintained as low as possible.

A heat sink means has been defined which permits passage of meat greases to a collection chamber, and at the same time returns maximizes heat return to the broiling area, and emits less heat toward the bottom of the housing.

While a preferred embodiment of this invention has been described in detail, it will be apparent to those skilled in the art that many modifications may be made therein without departing from the scope of the invention which is defined by the claims herein.

What is claimed is:

1. A broiling device comprising:
    a heat source,
    grill means for supporting meat in proximity to the heat source for broiling,
    means situated below the grill for collecting meat grease drippings from the meat,
    means in the form of a metal plate disposed beneath the heat source and grill and above the collecting means for temporarily intercepting falling meat grease drippings and for defining heat sink means,
    said plate having means for permitting drainage of grease drippings on toward the collecting means,
    said plate having a dark upper surface facing the heat source and grill for maximizing heat emittance back toward the grill.

2. The invention according to claim 1 wherein the upper surface of the plate comprises hills and valley for maximizing surface exposure.

3. The invention according to claim 2 wherein some of said valleys interconnect with one another and define inclined troughs for conveying grease and drippings to lower elevations and terminating at openings for drainage therethrough to the collecting means.

4. The invention according to claim 1 wherein the bottom surface of the plate has a lesser surface exposure.

5. The invention according to claim 1 wherein the metal plate is cast iron with openings therethrough defining means for drainage.

6. A broiler device comprising:
    a heat source,
    grill means for supporting meat in proximity to the heat source for broiling,
    means beneath the grill for collecting meat grease drippings,
    heat sink means horizontally disposed beneath the heat source and grill and above the collecting means and including means therethrough for drainage of meat grease drippings, having fallen thereon, on to the collecting means below,
    said heat sink means having a dark upper surface of hills and valleys for increasing surface exposure facing the grill for maximizing heat emittance back towards the grill.

7. The invention according to claim 6 wherein said valleys are disposed on an incline and interconnected for conveying meat grease drippings downwardly to said openings where they terminate.

8. In an open-air broiler having a grill for supporting meat in proximity to a heat source for broiling and a grease collecting means situated below the grill for catching grease drippings from the meat, the improvement comprising heat sink means in the form of a metal plate disposed beneath the grill and heat source and above the grease collecting means,
    said plate having means for permitting grease drippings, having fallen thereon from the meat, to pass on towards the collecting means,
    said plate having a dark upper surface of hills and valleys facing the grill as an aid to reemitting heat at a higher rate back toward the grill than toward the grease drippings beneath the plate.

9. The invention according to claim 8 wherein the valleys are interconnected and sloping from the hills and communicate with passage means for conveying grease drippings to beneath the plate.

10. Apparatus for open-air broiling of meat comprising:
    a housing including a recess having side walls and a bottom wall,
    a heat source supported in the housing,
    grill means at the entrance to the housing for supporting meat in proximity to the heat source for broiling,
    said bottom wall of the housing situated below the heat source for catching grease drippings from the meat,
    heat sink means in the form of a metal plate disposed below the heat source and above the bottom wall and permitting passage therethrough of grease drippings to the bottom wall,
    said plate having a black upper surface of uneven contour for increased surface exposure facing the grill whereby heat received from the heat source is radiated back toward the grill at a higher rate than on toward the grease drippings on the bottom wall.

11. The invention according to claim 10 wherein the housing bottom wall is provided with a slope for aiding flow of grease drippings therefrom toward a receptacle.

12. The invention according to claim 11 wherein the slope terminates in an opening leading to a removable grease drippings receptacle.

* * * * *